United States Patent [19]

Nishiyama et al.

[11] Patent Number: 4,964,503
[45] Date of Patent: Oct. 23, 1990

[54] MANIPULATOR USING A SINGLE MOTOR DRIVING PLURAL FLEXIBLE SHAFTS

[75] Inventors: Toru Nishiyama, Ayase; Hiroshi Minakami, Yokohama, both of Japan

[73] Assignee: Nissan Motor Co., Ltd., Yokohama, Japan

[21] Appl. No.: 282,546

[22] Filed: Dec. 12, 1988

[30] Foreign Application Priority Data

Dec. 10, 1987 [JP] Japan .......................... 62-187087[U]

[51] Int. Cl.$^5$ .................. F16D 21/02; F16D 27/12; F16D 67/02; B25J 9/00
[52] U.S. Cl. ................... 192/12 D; 74/479; 192/48.2; 192/48.8; 192/145; 248/178; 248/661; 901/21
[58] Field of Search .................. 192/48.9, 48.8, 48.2, 192/18 B, 0.098, 84 AA, 145, 12 D; 74/479; 901/21, 16; 248/658, 660, 661, 178

[56] References Cited

U.S. PATENT DOCUMENTS

| | | | |
|---|---|---|---|
| 750,370 | 1/1904 | Kammerer | 192/84 AA |
| 1,822,880 | 9/1931 | Braun | 192/48.9 X |
| 3,006,209 | 10/1961 | Stromberg | 192/48.9 X |
| 3,406,795 | 10/1968 | Pickles | 192/0.098 X |
| 3,547,240 | 12/1970 | Holper | 192/84 AA |
| 4,424,045 | 1/1984 | Kulischenko et al. | 901/21 X |
| 4,448,381 | 5/1984 | Anspaugh et al. | 248/429 X |
| 4,531,884 | 7/1985 | Russell | 192/48.9 X |
| 4,606,695 | 8/1986 | Lenz | 74/665 A X |
| 4,645,048 | 2/1987 | Inoue | 192/0.098 X |
| 4,662,814 | 5/1987 | Suzuki et al. | 901/26 X |
| 4,765,795 | 8/1988 | Rebman | 901/21 X |

FOREIGN PATENT DOCUMENTS 2120202 11/1983 United Kingdom .................. 901/16

Primary Examiner—Rodney H. Bonck
Attorney, Agent, or Firm—Pennie & Edmonds

[57] ABSTRACT

A manipulator features the use of a single motor and a plurality of flexible cables which are interconnected with the motor via a plurality of clutches which can be selectively engaged and disengaged. The cables transmit rotational energy to elements of the manipulator via translation devices which convert the rotational motion into linear motion.

9 Claims, 6 Drawing Sheets

FIG.1
PRIOR ART
FIG.2
PRIOR ART
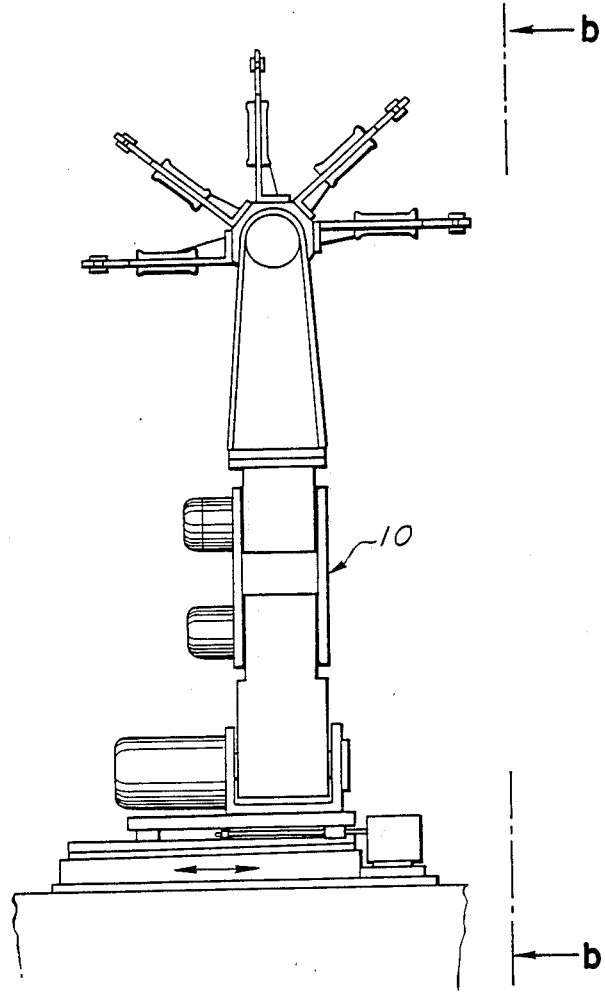
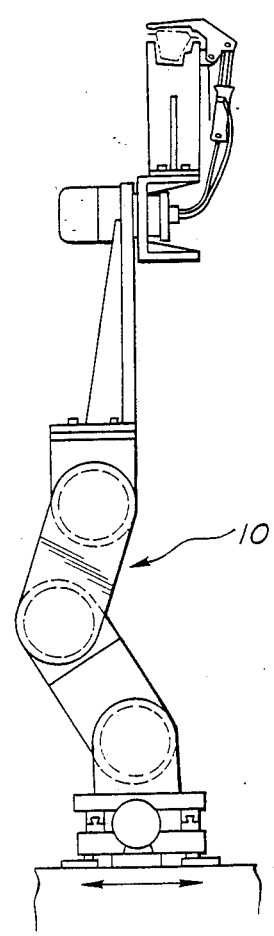

ized in U.S. Pat. No. 4,691,905 filed on Sep. 8, 1987 in
MANIPULATOR USING A SINGLE MOTOR DRIVING PLURAL FLEXIBLE SHAFTS

BACKGROUND OF THE INVENTION

1. Field of the Invention

The present invention relates generally to a device for supporting and positioning a work piece on an assembly line or the like and more specifically to a work piece positioning device which features a construction which enables the number of motors, weight and overall size of the device to be reduced.

2. Description of the Prior Art

FIGS. 1 and 2 show a manipulator arrangement disclosed in U.S. Pat. No. 4,691,905 filed on Sep. 8, 1987 in the name of Tamura et al. This arrangement, as shown, includes a kind of hip-knee-ankle type arrangement 10 on which a gauge plate arrangement is supported. The base of the device is arranged to enable the arrangement supported thereon to be moved in two mutually opposed directions in the manner indicated by the arrows. This arrangement while proving reasonably effective has suffered from the drawbacks that five motors are required to enable the appropriate control and movement of the same. This of course increases the cost and bulk of the arrangement.

SUMMARY OF THE INVENTION

It is an object of the present invention to provide a manipulator which is compact and which requires only one motor to enable the manipulation of a work piece or piece of apparatus in three dimensions.

In brief, the above object is achieved by an arrangement wherein a manipulator features the use of a single motor and a plurality of flexible cables which are interconnected with the motor via a plurality of clutches which can be selectively engaged and disengaged. The cables transmit rotational energy to elements of the manipulator via translation devices which convert the rotational motion into linear motion.

More specifically, a first aspect of the present invention is deemed to comprise a manipulator which features: a first element which is movable along a first axis; a second element which is movable along a second axis, the second axis being arranged to extend normally to the first axis; a third element, the third element being movable in a direction which is normal to a plane containing the first and second axes; a motor; first, second and third flexible shafts, the first, second and third flexible shafts being operatively connected with the first, second and third elements, respectively in a manner wherein rotational motion of the cables is translated into linear motion of the elements, and power transmission means for selectively interconnecting the flexible shafts with the motor, the power transmission means including clutch means which enables the selective connection of the first, second the third flexible cables to the motor.

A second aspect of the present invention is deemed to comprise a manipulator which features: a base member; a first plate member, the first plate member being supported on the base member in a manner wherein it is movable along a first axis relative to the base member; a second plate member, the second plate member being suported on the first plate member in a manner wherein it is movable along a second axis relative to the base member; a post member, the post member being supported on the second plate member in a manner to be wherein it is movable along a third axis, the third axis extending essentially normally to the second plate member; first, second and third translation devices, the first second and third translation devices being arranged to covert rotational motion into liner motion; a reversible motor; first, second and third flexible cables, the first second and third flexible cables being operatively connected with the first, second and third translation devices repectively; a clutch means for operatively interconnecting the first, second and third cables with the motor, the clutch means being arranged to selective connect the motor with the first, second and third flexible cables to induce rotation thereof.

BRIEF DESCRIPTION OF THE DRAWINGS

FIGS. 1 and 2 show the prior art arrangement discussed in the opening paragraphs of the instant disclosure;

DETAILED DESCRIPTION OF THE PREFERRED EMBODIMENTS

Figure 3:
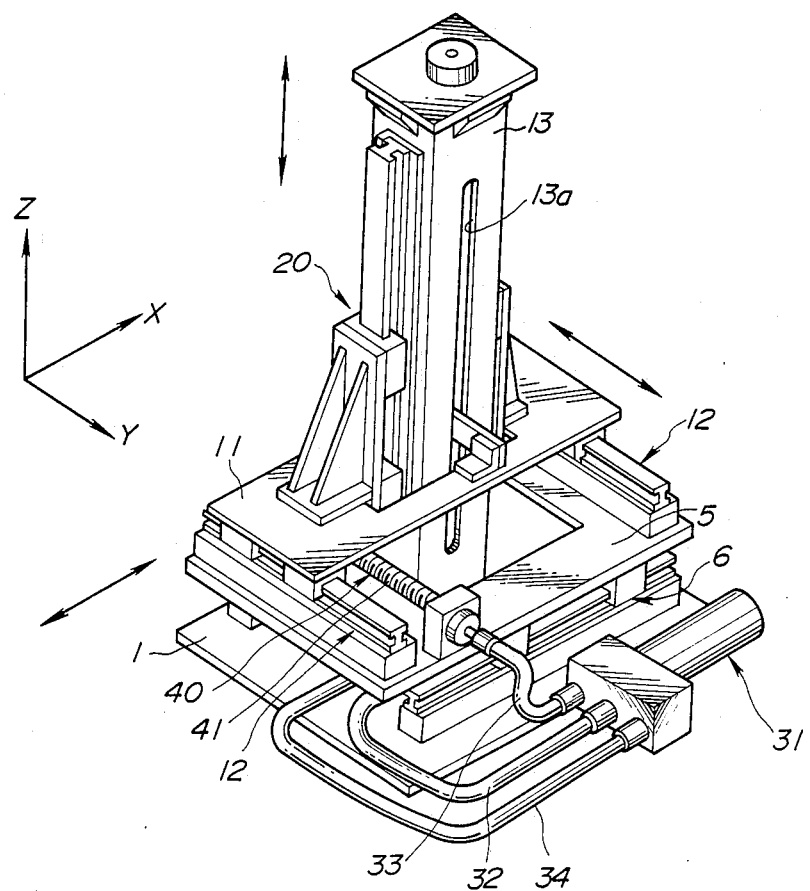
FIG. 3 is a perspective view showing an embodiment of the present invention.

FIG. 3 shows an embodiment of the present invention. This arrangement includes a fixed base member 1 on which two movable plates 5 and 11 are operatively supported. A vertically movable post member 13 is supported on the base plate 11.

The first and lower of the two movable plates is supported on the fixed base 1 by way of a guide rail arrangement. In this instance the rails are secured to the fixed base and the followers which slide on the rails are attached to the lower face of the movable plate 5. The upper movable plate 11 is provided with followers which slide on guide rails fixed to the upper face of the lower movable plate 5. The guide rails on the base plate and the lower movable plate are arranged to extend in opposite directions. Viz., along the X and Y axes as indicated.

The post member is provided with guide rails along opposed faces of the same. These rails are slidably received in guides which are mounted by way of brackets on the upper face of the upper movable plate 11. The post is therefore movable aloing the Z axis and therefore provides for the last of the three directions X, Y and Z which enables three dimensional manipulation.

The post is also provided with two elongate slots 13a for reasons which will become apparent later.

A single servo motor 31 is fixedly disposed to one side of the base plate. Operative drive connection between this motor and three sets of feed shafts and follower arrangements is established by way of three flexible shafts 32, 33, 34.

Figure 4:
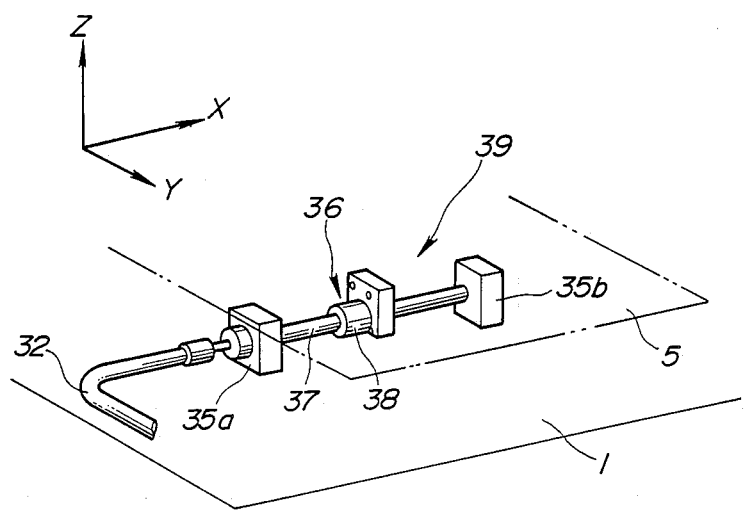
FIG. 4 is a schematic perspective view showing the connection of one of the flexible cables which form a part of the characterizing drive arrangement according to the present invention.
Figure 5:
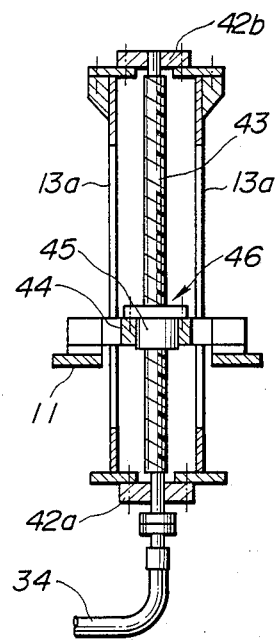
FIG. 5 is a sectional elevation showing the connection of the flexible cable with the vertically movable element of the manipulator.

FIG. 4 shows an example of how each of the movable plates is connected with the respective flexible cables. In this instance cable 32 is connected to an externally threaded shaft 37 which shall be referred to as a feed shaft which is rotatably supported at its ends by suitable bearing arrangements 35a and 35b. These bearings are fixedly secured to the base member 1. An internally threaded follower member which is fixed to the movable plate 5, is disposed on the feed shaft in a manner wherein rotation of the shaft induces the movable plate to be displaced along the X axis with respect to the base plate 1.

The second movable plate is provided with an essentially identical arrangement wherein the follower is fixed to the movable plate 11 and the bearings which support the feed shaft are fixed to the upper face of the plate 5.

A feed shaft 43 is mounted within the hollow post member 13 by way of upper and lower bearing arrangements 42a and 42b. An internally threaded follower which is operatively received on the feed shaft is connected with the upper face of the upper movable plate 11 by way of a bracket which extends through the elongate slots 13a.

As will be understood, with the above construction, selective rotation of the drive shafts enable the manipulator to move the support section thereof (in this case located on top) of the post 13 in three mutually opposed directions and thus enables three dimensional adjustment.

Figure 6:
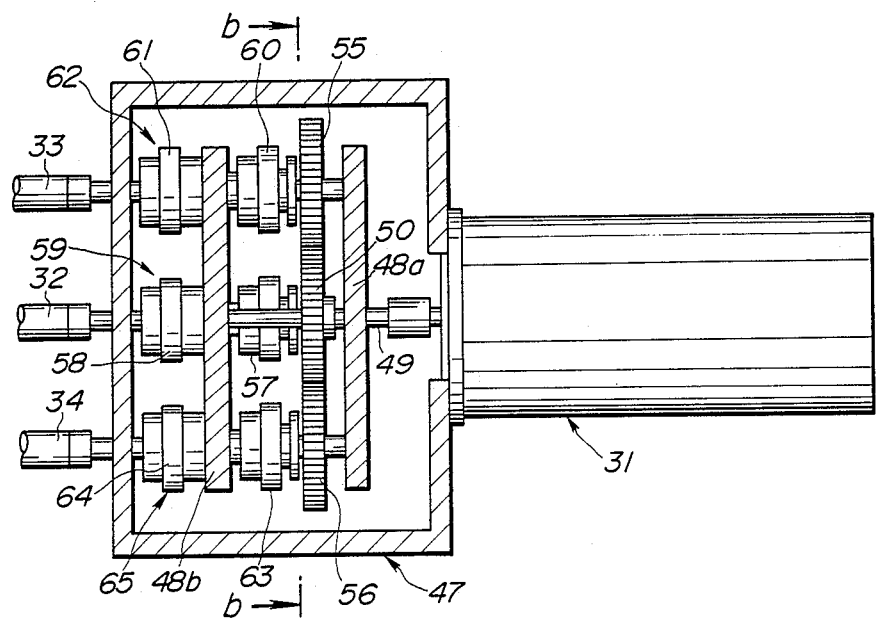
FIG. 6 is a partially sectioned elevation showing a clutch and brake arrangement which is used to provide selective drive connection between the single motor of the manipulator and the various flexible cables which are operatively connected thereto.

FIG. 6 shows, in cross sectional elevational form, a transfer case which houses a clutch and brake arrangement which enables the selective drive/braking of each of the three flexible cables used in this embodiment.

Figure 7:
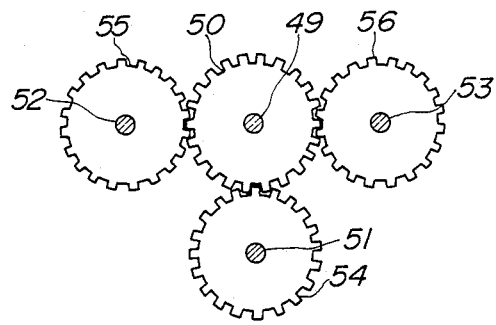
FIG. 7 is an elevation showing the interconnection of the gears which comprise the arrangement shown in FIG. 6.

This arrangement includes (as best seen in FIG. 7) four intermeshing gears 50, 54, 55 and 56 which are respectively mounted on shafts 49, 51, 52 and 53. These shafts are supported by brackets 48a.

In this instance shaft 49 is connected to the output shaft of the motor 31 for synchronous rotation therewith. Accordingly, gear 50 acts as input gear and gears 54, 55 and 56 act as output gears. With this arrangement, all of the output gears rotate in the same direction.

The shaft 52 (first output gear 55) is operatively connected with the first flexible cable 33 by way of a clutch 60 and a brake 61. These elements define a first drive control arrangement which in this instance is generally denoted by the numberal 62. In a similar manner clutch and brakes 57 and 58 and 63 and 64 define second and third drive control arrangements 59 and 65 which are operable to establish selective drive connections between the shafts 51 and 53 and the second and third flexible cables 32 and 34.

In this particular embodiment a bracket 48b is arranged to extend between each of the brakes and clutches and to support the shafts which operatively extend between the same.

In order to establish a drive connection between the motor 31 and any one of the flexible cables, all that is necessary is for the appropriate clutches to be engaged and the corresponding brake released. Conversely, when it is desired to stop the movement of the element which is operatively connected to the end of the cable in question, all that is necessary is to apply the brake and release the clutch.

Figure 8:
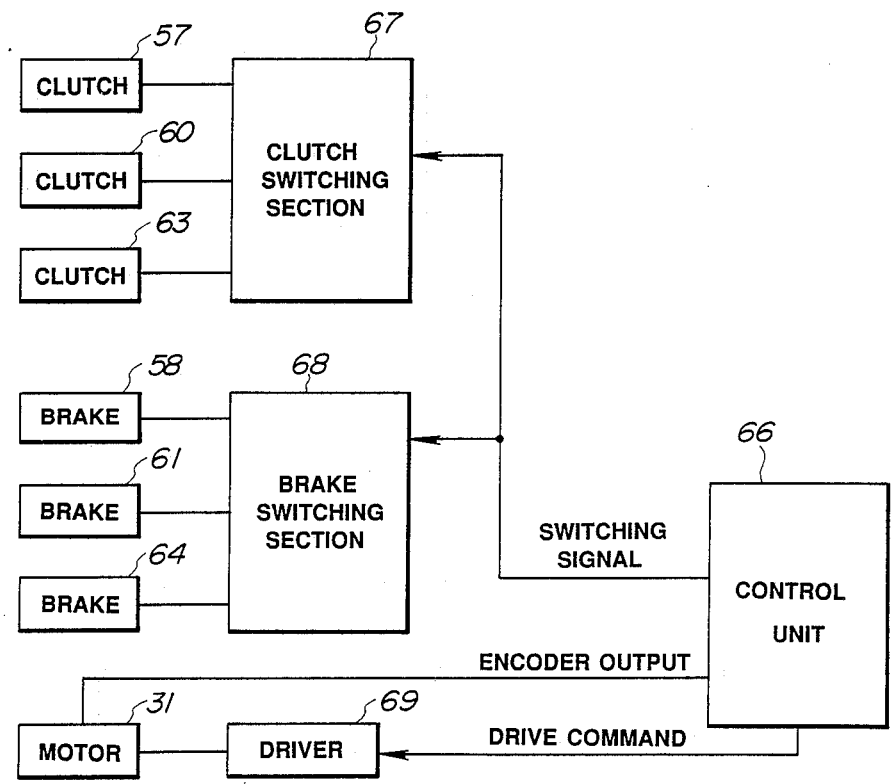
FIG. 8 is a block diagram showing the arrangement which is used to control the operation of the clutches, brakes and motor which form vital parts of the present invention.

FIG. 8 shows in block diagram form the control hardware via which the brakes, clutches and motor are operated. As will be appreciated, the clutches are operatively connected with a clutch switching section 67 while each of the brakes is connected with a brake switching section 68. A control unit 66 which in this instance includes a microprocessor (not shown), is arranged to issue a drive command to a driver circuit 69 which is operatively connected with the motor 31, and switching signals to the clutch and brake switching sections 67 and 68. The motor 31 is provided with an encoder which produces pulses indicative of the rotation thereof. These pulses are fed back to the control circuit and supplied to the microprocessor which is arranged to count up and down depending on the direction and number of rotations of the motor 31 and thus keep track of the position of the elements connected with the respective flexible cables.

Figure 9:
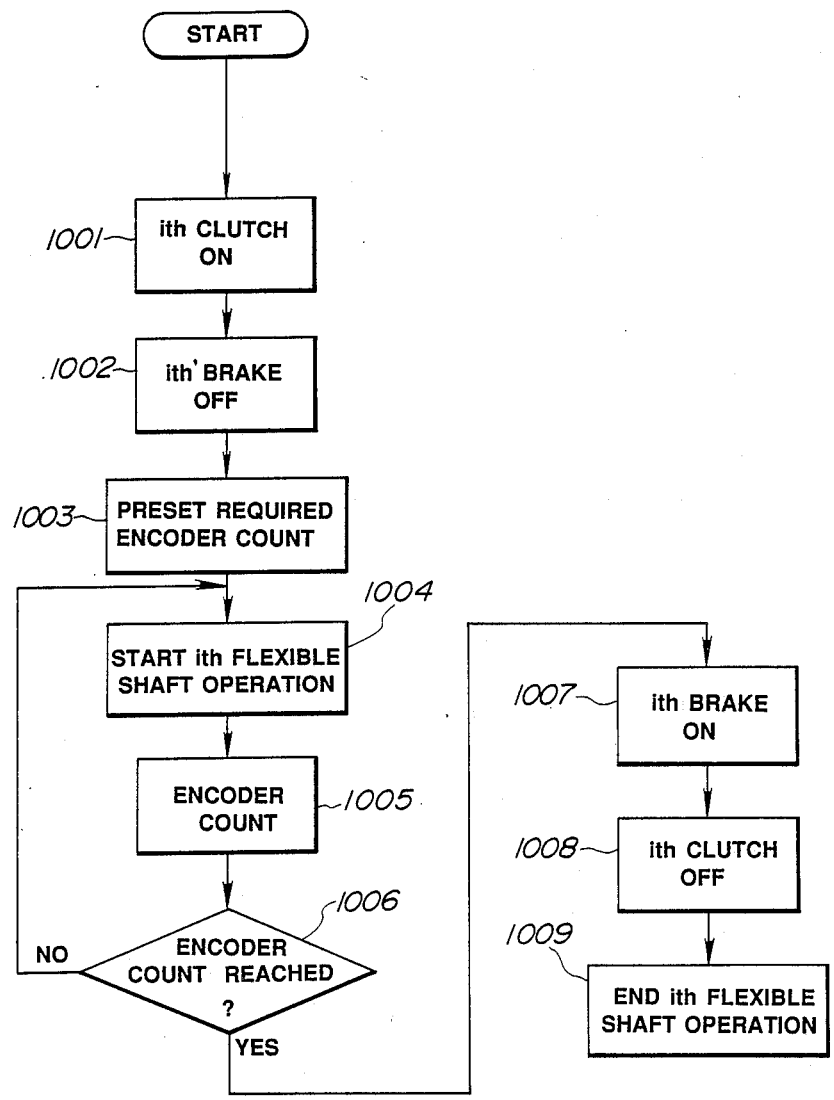
FIG. 9 is a flow chart showing the steps which characterize the operation of the present invention.

FIG. 9 shows in flow chart form the steps which are executed during the operation of the above described system. For simplicity of explanation, only the control of one of the cables will be given. However, as will be readily understood it is within the scope of the present invention to control all of the cables simultaneously or as the situation demands.

The first three steps of the program are such as to issue a command which engages a given clutch for the ith time, release the corresponding brake and to set the encoder count which is required to bring the instant element to a preselected position. At step 1004 a command to start the ith flexible shaft operation is issued and at step 1005 the output of the encoder is read and the appropriate count recorded in the microprocess is updated.

At step 1006 the instant count is sampled and compared with the required one. The program is arranged to recycle until such time as the appropriate value is reached after which the brake is applied and the clutch released in step 1007 and 1008. At step 1009 a command which ends the ith operation of the given flexible shaft is issued.

Depending on the environment in which the manipulator is being used, data which is set in step 1003 and which is recorded during the termination of the instant run will vary widely and may be subject to various adjustments depending upon a monitoring operation which detects the manipulator having placed the work piece or piece of apparatus in the desired position. By way of example only, it may be that the manipulator according to the present invention is being used in a totally automated vehicle assembly line wherein a work piece is to be disposed precisely in the predetermined position. The initial count set in step 1003 may be one which will bring the work piece to essentially the required position and final control determined by the use of a optical type (laser) scanning system which establishes if the required positioning has being achieved or not. In the event that some adjustment is necessary, the program shown in FIG. 7 can be run again after the required encoder count has been decided.

As will be appreciated, the present invention features the use of only a single motor. The flexible cables which are used to transmit the rotational drive energy to the respective feed shafts can be wound around corners and pass through spaces too small to permit the disposition of a motor for each of the (three) movable elements. Accordingly, it is possible to render the manipulator compact and relatively light in weight as compared with the multi-motor arrangements disclosed in the opening paragraphs of the instant disclosure.

What is claimed is:

1. In a manipulator
a first element which is movable along a first axis;
a second element which is movable along a second axis, said second axis being arranged to extend normally to said first axis;
a third element, said third element being movable in a direction which is normal to a plane containing said first and second axes;
a motor;
a first, second and third flexible shafts, said first, second and third flexible shafts being operatively connected with said first, second and third elements, respectively in a manner wherein rotational motion of said flexible shafts is translated into linear motion of the elements, and
power transmission means for selectively interconnecting said flexible shafts with said motor, said power transmission means including clutch means which enables the selective connection of said first, second and third flexible shafts to said motor.

2. A manipulator comprising:
a base member;
a first plate member, said first plate member being supported on said base member in a manner wherein it is movable along a first axis relative to the base member;
a second plate member, said second plate member being supported on said first plate member in a manner wherein it is movable along a second axis relative to said base member;
a post member, said post member being supported on said second plate member in a manner to movable along a third axis, said third axis extending essentially normally to said second plate member;
first, second and third translation devices, said first second and third translation devices being arranged to convert rotational motion into liner motion;
a reversible motor;
first, second and third flexible cables, said first second and third flexible cables being operatively connected with said first, second and third translation devices repectively;
a clutch means for operatively interconnecting said first, second and third cables with said motor, said clutch means being arranged to selective connect said motor with said first, second and third flexible cables to induce rotation thereof.

3. A manipulator as claimed in claim 2 wherein said clutch means comprises:
first, second and third output shafts, said first second and third output shafts being operatively connected with the output drive shaft of said motor and arranged to be synchronously driven thereby; and
first, second and third clutches, said first, second and third clutches being operatively interposed between said first, second and third output shafts and said first, second and third flexible cables respectively, said first, second and third clutch means being selectively operable in response to control signals applied thereto.

4. A manipulator as claimed in claim 3 further comprising:
an encoder, said encoder being disposed with said motor and arranged to produce pulses indicative of the rotation of the motor;
a control circuit, said control circuit being responsive to the pulses issued by said encoder and arranged to generate and issue said control signals to said first, second and third clutches.

5. A manipulator as claimed in claim 2 wherein said clutch means further includes first, second and third brakes, said first, second and third brakes being arranged with said first, second and third clutches in a manner wherein when a clutch is enagaged the corresponding brake is released and vice versa.

6. A manipulator as claimed in claim 2 wherein said clutch means comprises:
an input gear operatively connected with said reversible motor;
first, second and third output gears, said first, second and third output gears being arranged to mesh with said input gear; and
first, second and third selectively engageable clutches operatively interconnecting said first second and third output gears and said first second and third flexible cables, respectively.

7. A device according to claim 6 further comprising first, second and third selectively operable brakes, said first, second and third brakes being operatively connected with said first, second and third flexible cables respectively.

8. In a device for supporting a work piece
a manipulator, said manipulator comprising:
a first base plate, said first base plate being rigidly connectable to a base for support thereon;
a second plate, said second plate being located above and arranged essentially parallel with said first plate, said second plate being slidably mounted on said first plate so as to be movable in first and second opposite directions with respect to said first plate;
a third plate, said third plate being located above and arranged essentially parallel with said second plate, said third plate being slidably mounted on said second plate so as to be moveable in third and fourth opposite directions, said third and fourth directions extending at right angles with respect to said first and second directions;
means defining first, second and third apertures in the central portions of said first, second and third plates respectively;
an elongateable post member, said post member being arranged normally with respect to the major surfaces of said first second and third plate and arranged to pass through said first, second and third apertures;
a motor;
an input gear operatively connected with said motor;
first, second and third output gears, said first, second and third output gears being arranged to mesh with said input gear;
first, second and third flexible cables;
first, second and third selectively engageable clutches operatively interconnecting said first, second and third output gears and said first, second and third flexible cables, respectively;

first, second and third translation device, said first, second and third translation devices operatively interconnecting said first rotatable cable and said second plate, said second cable and said third plate and said third cable and said elongateable post member, said first, second the third translation devices being arranged to convert rotation of said first, second and third cables into linear motion.

9. In a device for supporting a work piece a manipulator, said manipulator comprising:

a first base plate, said first base plate being rigidly connectable to a base for support thereon;

a second plate, said second plate being located above and arranged essentially parallel with said first plate, said second plate being slidably mounted on said first plate so as to be moveable in first and second opposite directions with respect to said first plate;

a first rotation to linear motion translation device, said first rotation to linear motion translation device being mounted on said first plate so as to be located between said first and second plates, said first rotation to linear motion translation device being operatively connected with said second plate by way of a first drive connection, said first rotation to linear motion translation device being opeable to drive said second plate in a selected one of said first and second directions;

a third plate, said third plate being located above and arranged essentially parallel with said second plate, said third plate being slidably mounted on said second plate so as to be moveable in third and fourth opposite directions, said third and fourth directions extending at right angles with respect to said first and second directions;

a second rotation to linear motion translation device, said second rotation to linear motion translation device being mounted on said second plate so as to be located between said second and third plates, said second rotation to linear motion translation device being operatively connected with said third plate by way of a second drive connection, said second rotation to linear motion translation device being operable to drive said third plate in a selected one of said third and fourth directions;

means defining first, second and third apertures in the central portions of said first, second and third plates respectively;

an elongateable post member, said post member being arranged normally with respect to the major surfaces of said first, second and third plates and arranged to pass through said first, second and third apertures, said post member being slidably supported by said third plate;

a third rotation to linear motion translation device, said third rotation to linear motion translation device being operatively connected with said post member in a manner to selectively elongate said post member;

a motor;

an input gear operatively connected with said motor;

first, second and third output gears, said first, second and third output gears being arranged to mesh with said input gear;

first, second and third flexible cables, said first, second and third flexible cables having their first ends operatively connected with said first second and third rotation to linear motion translation devices respectively;

first, second and third selectively engageable clutches operatively interconnecting said first, second and third output gears and second ends of said first, second and third flexible cables, respectively.

* * * * *